United States Patent
Matthews et al.

[11] Patent Number: 6,042,466
[45] Date of Patent: Mar. 28, 2000

[54] EXTRUSION APPARATUS

[75] Inventors: Bernard Trevor Matthews; David John Joll; David Norman Wilson; John Harry Barker, all of Norfolk, United Kingdom

[73] Assignee: Bernard Matthews PLC, Norfolk, United Kingdom

[21] Appl. No.: 09/261,891

[22] Filed: Mar. 3, 1999

Related U.S. Application Data

[62] Division of application No. 08/994,105, Dec. 19, 1997.

[30]  Foreign Application Priority Data

Dec. 20, 1996 [GB] United Kingdom .................. 9626575

[51] Int. Cl.⁷ .................................................. A22C 11/00
[52] U.S. Cl. ........................... 452/45; 452/36; 426/105; 425/133.1
[58] Field of Search ................. 452/45, 30, 36; 426/105, 513, 140, 273; 425/133.1

[56]  References Cited

U.S. PATENT DOCUMENTS

| 3,739,427 | 6/1973 | Niedecker | 452/45 |
| 4,570,298 | 2/1986 | Tribbett | 452/36 |
| 4,915,968 | 4/1990 | Matthews et al. | 452/36 |
| 5,573,455 | 11/1996 | Barilli | 452/45 |
| 5,888,131 | 3/1999 | Kobussien et al. | 452/30 |

FOREIGN PATENT DOCUMENTS

| 0 024 790 A1 | 6/1980 | European Pat. Off. . |
| 0 300 587 A1 | 2/1988 | European Pat. Off. . |
| 0 720 816 A1 | 1/1996 | European Pat. Off. . |
| 0 741 973 A1 | 4/1996 | European Pat. Off. . |
| 7310221 | 3/1973 | France . |
| 47634 | 6/1889 | Germany | 452/45 |
| 172458 | 9/1952 | Germany | 452/45 |

Primary Examiner—Willis Little
Attorney, Agent, or Firm—Ratner & Prestia

[57]  ABSTRACT

The invention provides a meat product comprising extruded inner core of meat substrate and one or more co-extruded outer layers wholly or partly around the core, wherein at least of the outer layers consists of a meat or fat emulsion; characterized in that the fibres within the meat or fat emulsion layer are distributed substantially uniformly within the emulsion layer and are disoriented, so as to improve the cohesiveness of that layer. The invention also provides an extrusion nozzle for forming the meat product of the invention.

14 Claims, 3 Drawing Sheets

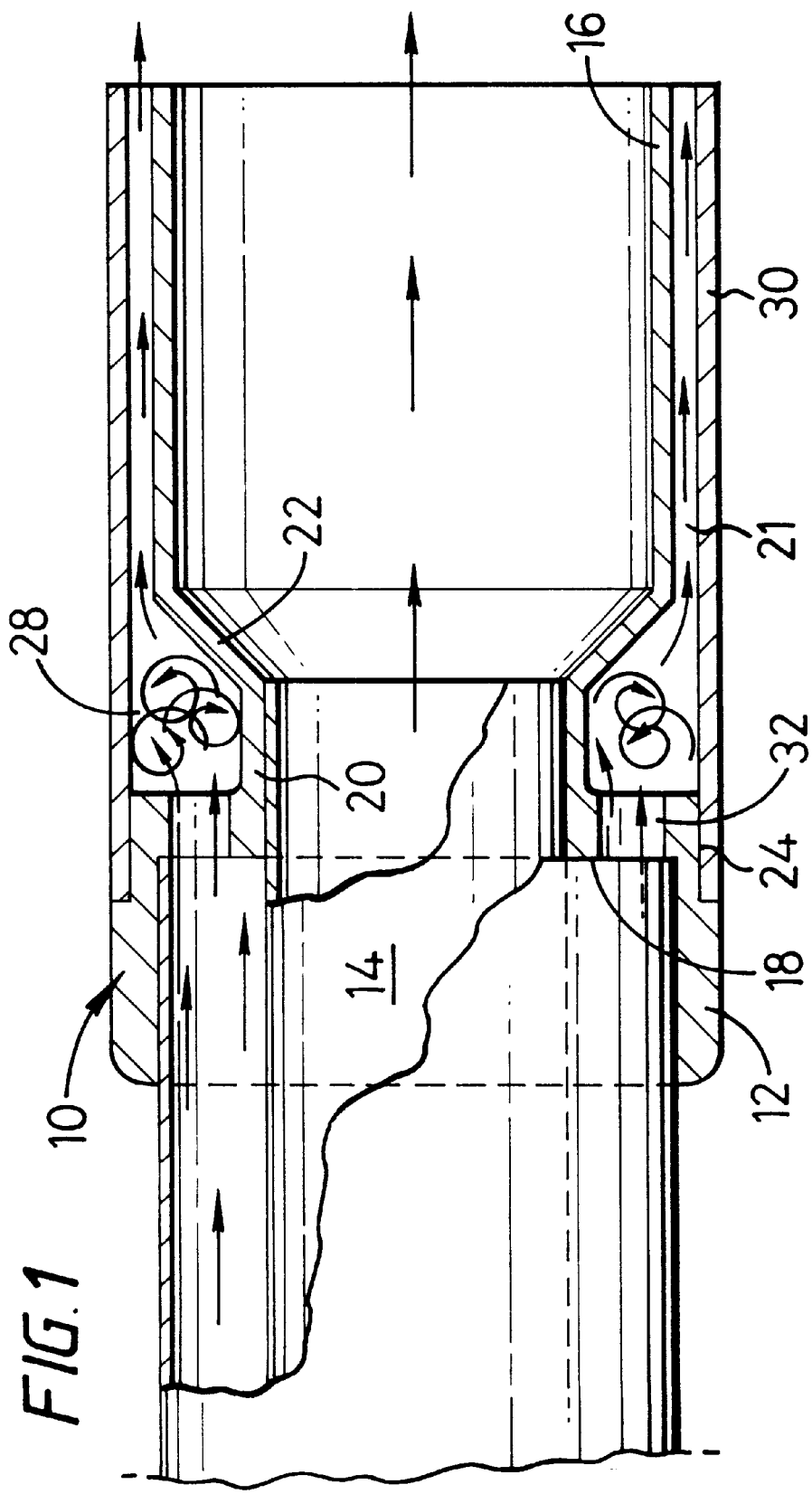

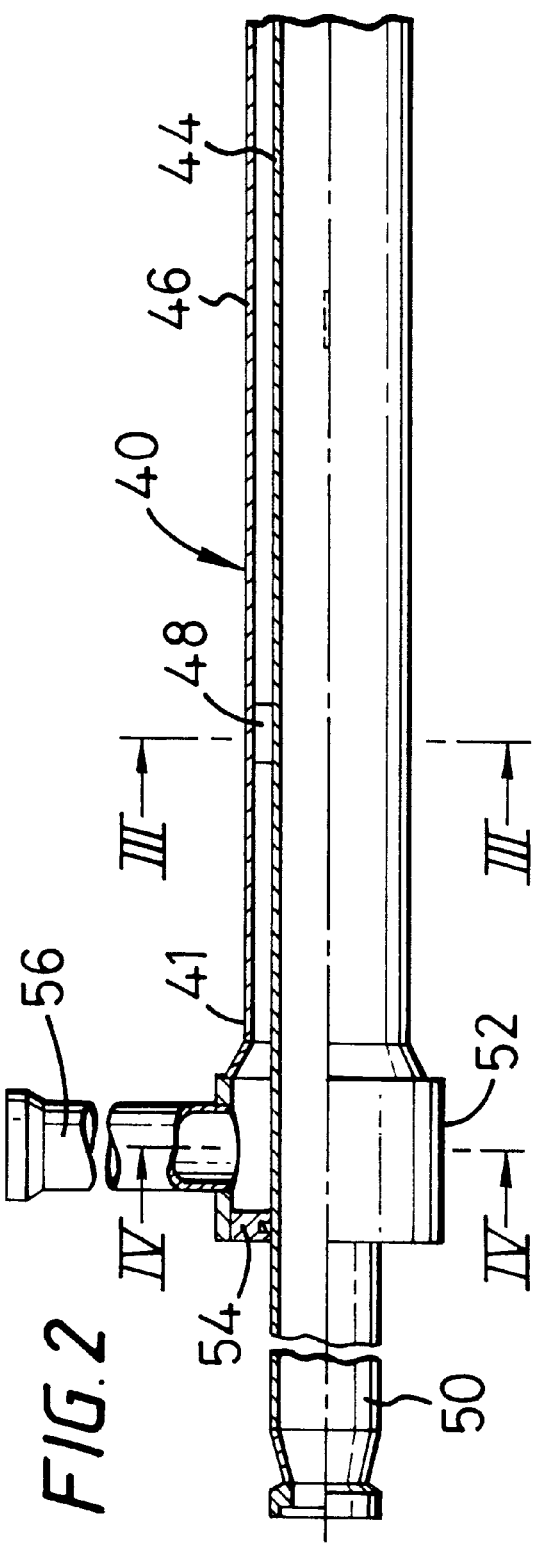
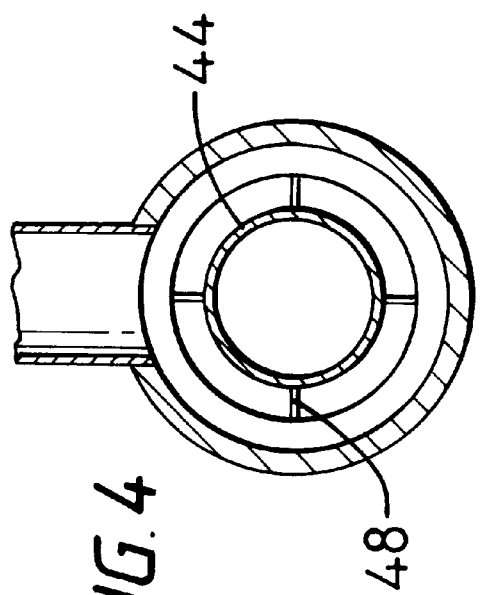
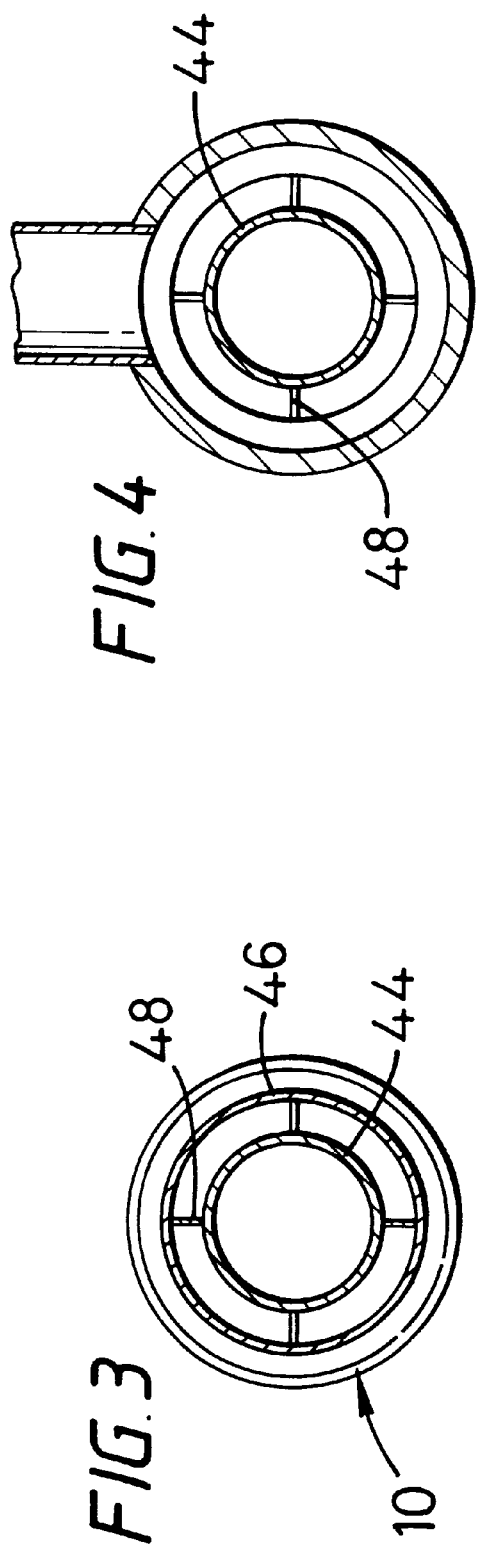

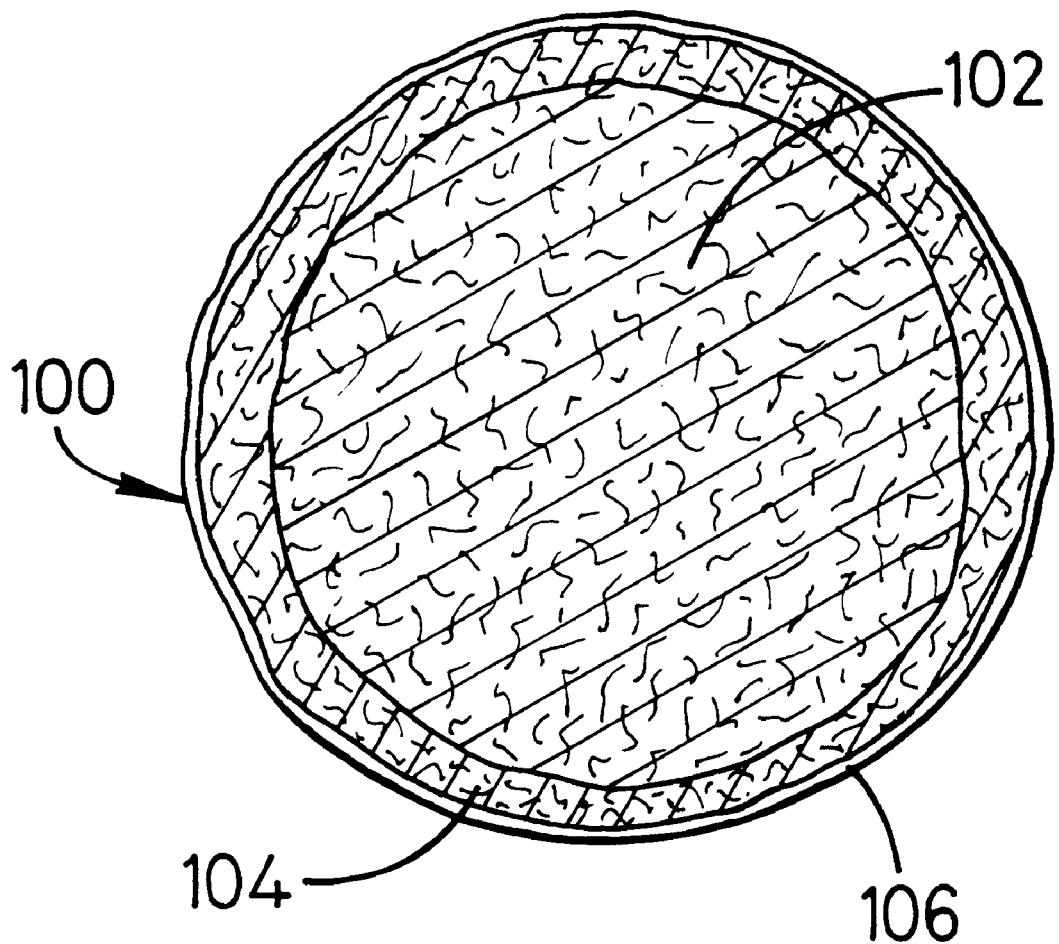

EXTRUSION APPARATUS

This application is a division of application Ser. No. 08/994,105, filed Dec. 19, 1997, pending.

The present invention relates to extrusion apparatus for the extrusion of food substrates, particularly meat. Specifically, the present invention provides a novel extrusion nozzle and also an extruded meat product manufactured using the new nozzle.

EP-A-0720816 discloses a process for the manufacture of a natural, curved sausage product comprising co-extruding at least two meat doughs, and providing the co-extruded dough with a skin. At least one of the meat doughs is extruded through a venturi such that the fibres are randomised, and at least are one dough is extruded such that the fibres are substantially aligned. The two doughs are co-extruded side-by-side, so that on subsequent cooking, the different fibre orientations in the two doughs cause differential shrinkage of the doughs, thereby giving rise to curving of the product.

EP-A-0024790 discloses apparatus for co-extruding an inner core of meat with an outer, annular layer of fat emulsion. The apparatus comprises a stuffing horn and a nozzle which is fitted to the downstream end of the stuffing horn. Said stuffing horn comprises two co-axial tubes which define an inner conduit for the meat and an outer, annular conduit for the fat emulsion. The meat and fat are admitted to the stuffing horn at an upstream end using separate mechanical pumps. The extrusion head similarly defines two co-axial conduits which communicate with the corresponding conduits in the stuffing horn. The co-extruded product debouches from the extrusion head into a flexible, plastics casing which encircles the stuffing horn and extrusion head.

With reference to the stuffing horn, the innermost tube is supported in the interior of the outermost tube by means of a plurality of circumferentially spaced spacers or vanes. These vanes thus constitute obstacles in the path of the fat emulsion through the stuffing horn.

As will be well known in the art, fat and meat emulsions of the kind which are generally employed in apparatus of the kind disclosed by EP-A-0024790 comprise fibrous meat or fat components and emulsifiers. A problem which has been observed in co-extruded products manufactured using the apparatus of EP-A-0024790 is that there is a tendency for the outer fat emulsion layer to split in the direction of extrusion during cooking. It is thought that this splitting may be caused by a lack of cohesion between adjacent fibres in the emulsion that have been streamlined by passage over the vanes in the outer conduit of the stuffing horn, and by the depletion of such fibres in longitudinal zones within the emulsion downstream of the spacers.

An object of the present invention is to solve or at least alleviate this problem. Specifically, it is an object of the present invention to provide means for manufacturing a co-extruded meat product having a core of a first extrudable food substrate and one or more contiguous outer layers of the same or different extrudable food substrates disposed wholly or partly around the core, wherein at least one of the outer layers consist of fibrous meat or fat emulsion, which co-extruded meat product has a reduced tendency for splitting of the meat or fat emulsion layer when the product is cooked.

According to one aspect of the present invention therefore there is provided an extrusion nozzle for co-extruding a core of a first extrudable food substrate, with one or more contiguous outer layers of the same or different extrudable food substrates disposed wholly or partly around the core, wherein at least one of the outer layers consists of a fibrous meat or fat emulsion; which extrusion nozzle comprises a first inner extrusion conduit for extruding said first substrate therethrough and one or more outer extrusion conduits disposed wholly or partly around the inner conduit for extruding said one or more outer layers; characterised in that at least one of the outer conduits which is for extruding said fat or meat emulsion defines a fluid flow path having a first narrow portion of relatively small cross-sectional area followed by a second enlarged portion downstream of said narrow portion, which enlarged portion has relatively large cross-sectional area, the arrangement being such that when said meat or fat emulsion passes successively through the narrow portion to the enlarged portion, the fibres within the emulsion become disorientated thereby increasing the cohesiveness of the extruded emulsion.

In another aspect, the present invention provides extrusion apparatus comprising a stuffing horn and an extrusion nozzle in accordance with the present invention, wherein the stuffing horn comprises a plurality of nesting tubes which define an inner conduit and one or more outer conduits, and said stuffing horn can mate with the extrusion nozzle such that each stuffing horn conduit communicates with a respective nozzle conduit, wherein each tube is supported within its surrounding tube by a plurality of circumferentially spaced spacers.

In yet another aspect of the present invention there is provided a meat product comprising an extruded inner core of meat substrate and one or more co-extruded outer layers disposed wholly or partly around the core, wherein at least one of the outer layers consists of a meat or fat emulsion; characterised in that the fibres within the meat or fat emulsion layer are distributed substantially uniformly within the emulsion layer, and are disorientated, so as to improve the cohesiveness of that layer.

It is envisaged that usually the meat product will consist of the inner core of meat and a single outer layer of said meat or fat emulsion.

With reference to the extrusion nozzle of the present invention, said narrow portion may be defined by a wall across the flow path of the meat or fat emulsion, which wall has one or more holes formed therein so as to provide a constriction in the flow path. It will be understood that the enlarged portion in the flow path constitutes a "swirl" chamber, and the essence of the invention consists in the effect on the meat or fat emulsion by passing from the narrow portion into the enlarged portion. As the meat or fat emulsion enters the swirl chamber, it loses velocity and spreads out to fill the chamber before exiting the extrusion nozzle as the final extrusion. The spreading out process, and the collision of the relatively fast moving material entering the chamber with the material already in the chamber produces a substantially uniform emulsion with substantially random fibre orientation that maintains the cohesion of the fibres during the cooking process. The disorientation of the fibres in the outer, fat emulsion layer may also increase the cohesiveness between said outer layer and the core of meat substrate.

Downstream of the enlarged portion, the conduit may comprise an outlet having a cross-sectional area which is smaller than that of the enlarged portion. Said inner conduit is generally circular or elliptical in cross-section, and each of the outer conduits is of annular or ellipto-annular cross-section.

Following is a description by way of example only and with reference to the accompanying drawings of methods carrying the present invention into effect.

In the drawings:

FIG. 1 is a sectional view through an extrusion nozzle in accordance with the present invention along the axis of extrusion.

FIG. 2 is a side view, partly in cross-section, of a stuffing horn with the kind disclosed by EP-A-0024790 which can be used in conjunction with the extrusion nozzle of FIG. 1.

FIG. 3 is a cross-sectional view across the axis of extrusion of the stuffing horn of FIG. 2 on the line III—III.

FIG. 4 is a cross-sectional view of the stuffing horn of FIG. 2 across the axis of extrusion on the line IV—IV.

FIG. 5 is a cross-sectional view of an extruded product according to the present invention.

The extrusion nozzle of FIG. 1 comprises two parts: a body part (10) and a ring (30). The body part (12) which is manufactured as a single piece from stainless steel by moulding or sintering comprises, at one end, a generally cylindrical portion (12) having a bore (14) which is shaped to accommodate as a tight fit the downstream end of a stuffing horn. At the other end, the body part includes a cylindrical wall (16) that has an outer diameter that is smaller than that of the cylindrical portion (12). Intermediate said cylindrical portion (12) and cylindrical wall (16), the body part (10) includes an annular flange (18) that is joined to the cylindrical portion (12) and a funnel portion (20) that extends from the flange portion (18) towards the other end of the body part and includes an outwardly flaring frusto-conical portion (22) that is joined to the cylindrical wall (16).

The outer surface of the cylindrical portion (12) is shaped juxtaposed the flange (18) to define a rebate (24) for the ring (30). Said ring (30) can be fitted over the cylindrical wall (16) and funnel portion (20) of the body part (10) such that one end of the ring (30) is accommodated in said rebate (24). In the fitted position, the ring (30) and body part (10) define a space therebetween of annular cross-section (20). Juxtaposed the cylindrical wall (16) of the body part (10), the space has relatively small cross-sectional area, while juxtaposed the funnel portion (20), the two parts (10,30) define a region (28) having a relatively large cross-sectional area.

Said annular flange (18) is drilled as shown in FIG. 1 to provide a plurality of circumferentially spaced apertures (32) that allow the bore of the cylindrical portion (12) to communicate with the enlarged region (28).

The extrusion nozzle described above is suitable for use with a stuffing horn of the kind disclosed in EP-A-0024790, which stuffing horn is illustrated in FIGS. 2 to 4. Said stuffing horn (40) has an upstream end (41), and a downstream end (42) and consists essentially of two coaxial tubes; an inner tube (44) and an outer tube (46). The inner tube (44) terminates at its upstream end in an inlet (50) that is adapted for connection to a suitable pumped supply of meat substrate. For instance, inlet (50) may be connected to a hopper (not shown) via a mechanical meat pump (also not shown). Said hopper may be fed with any suitable, extrudable meat substrate, such as lean meat or extended meat. Animal, poultry or fish meat may be used, but in a preferred embodiment the inlet (50) is supplied with de-boned, whole muscle turkey meat.

Said outermost tube (46) is connected at its upstream end to manifold (52) that is disposed downstream of inner tube inlet (50). Said manifold (52) includes an annular wall (54) at its upstream end and a radially extending port (56), which port is adapted to be connected to a suitable pumped supply of meat or fat emulsion. As disclosed in EP-A-0024790, the radial port (56) may, for instance, be connected to a hopper via a suitable mechanical pump, and the hopper may be fed with meat or fat emulsion. Said meat emulsion or fat emulsion may comprise fibrous lean meat or fat particles and an emulsifying agent. Said meat or fat emulsion may optionally comprise additional stabilizing agents of the kind which are well known in the art.

Said innermost tube (44) extends through the central hole defined by the annular wall (54), and an O-ring seal is provided therebetween. The annular wall (54) thus serves to support the innermost tube (44) at its upstream end in coaxial relation with the outermost tube (46). Downstream of the manifold (52), the inner tube (44) is spaced from the outer tube (46) by means of a plurality, in this case four, of circumferentially spaced spacers (48). Each spacer comprises a rectangular piece of stainless steel which is typically cut from a sheet and is welded to the outer surface of the inner tube (44). Each spacer is oriented as shown in the Figures such that the plane of the sheet intersects the central, longitudinal axis of the stuffing horn (40).

The inner tube (44) thus defines a central conduit which can be supplied with meat, and the inner and outer tubes (44,46) define between them an annular conduit which can be supplied with meat or fat emulsion.

The downstream end (42) of the stuffing horn (40) can be fitted into the bore (14) of the extrusion nozzle, such that the downstream end of the outer tube (46) abuts on the flange (18). As will be seen from FIGS. 1 and 2, the downstream end of the inner tube (44) protrudes beyond that of the outer tube (46), and has an outer diameter such that it forms a snug fit in the funnel portion (20) of the body part (10). The annular conduit defined by the inner and outer tubes (44,46) of the stuffing horn can communicate with the enlarged space (28) via the apertures (32), while the central conduit defined by the inner tube (44) can communicate with the interior space defined by the cylindrical wall (16). Thus, meat substrate pumped through the central conduit of the stuffing horn (40) exits the downstream end of the innermost tube (44) and passes into the interior space defined by the cylindrical wall (16) of the body part (10), while meat or fat emulsion pumped along the annular space defined by the inner and outer tubes (44,46) passes through the apertures (32) into the enlarged space (28), and then into the narrower annular conduit between the cylindrical wall (16) and ring (30). The meat substrate and meat or fat emulsion then debouch the extrusion nozzle and can be received in a flexible, plastic casing of the kind disclosed by EP-A-0024790, a rouched supply of which flexible casing may encircle the outermost tube (46) downstream of said manifold (52).

The co-extrusion of the meat substrate and fat or meat emulsion thus forms a co-extruded food product (100) as shown in cross-section in FIG. 5, said product comprising a core of meat substrate (102) and an outer layer of fat or meat emulsion (104). As disclosed by EP-A-0024790, the product may be steamed in the casing (106), and the casing may then be removed and the product sliced. Alternatively, the extrudate may be cut whilst still in the casing into portions of intermediate length which may then be roasted in a conventional oven, with the casing being removed after cooking.

It will be appreciated that as the meat or fat emulsion flows along the annular conduit between the inner and outer tubes (44,46), it passes over the plate-like spacers (48) which tend to orient the fibres in the emulsion in a direction parallel to the flow, and to produce longitudinal zones within the emulsion downstream of the spacers, which zones are depleted of fibres. On passing through the apertures (32) into the enlarged space (28), the flow of meat or fat emulsion is retarded and substantial mixing occurs. It is thought that this mixing has the effect of disorienting the fibres in the meat or fat emulsion, thereby improving the uniformity of the fat emulsion layer (104). It will be seen from FIG. 1 that no further obstacles are present in the flow path of the meat or fat emulsion downstream of the enlarged space (28), and thus the fibres remain disorientated when they are extruded at the other end of the nozzle. The enlarged space (28) thus constitutes a "swirl chamber" for the meat or fat emulsion, and the disorienting effect on the fibres as a result of the deceleration is thought to increase the cohesiveness of the fibres. It has been found that this leads to a reduced tendency for the meat or fat emulsion layer (104) of the extruded product (100) to split along the direction of extrusion during the cooking process. It is also thought that the disorienting of the fibres may increase the adhesiveness of the meat or fat emulsion layer to the central core (102) of meat substrate, thus reducing the tendency for the meat or fat emulsion layer to delaminate from the core meat substrate after cooking.

What is claimed is:

1. An extrusion nozzle for co-extruding a core of a first extrudable food substrate, with one or more contiguous outer layers of the same or different extrudable food substrates disposed wholly or partly around the core, wherein at least one of the outer layers comprises of a fibrous meat or fat emulsion; said extrusion nozzle comprising a first inner extrusion conduit for extruding said first substrate therethrough and one or more outer extrusion conduits disposed wholly or partly around the inner conduit for coextruding said one or more outer layers with the core; wherein at least one of the outer conduits which is for extruding said fibrous fat or meat emulsion defines a fluid flow path having a first narrow portion of relatively small cross-sectional area followed by a second enlarged portion downstream of said narrow portion, which enlarged portion has a relatively large cross-sectional area, the arrangement being such that when the meat or fat emulsion passes successively through the narrow portion to the enlarged portion, the fibres within the emulsion become disoriented, thereby increasing cohesiveness of the extruded emulsion.

2. An extrusion nozzle as claimed in claim 1, wherein said narrow portion is defined by a wall across the flow path of the mean or fat emulsion, which wall has one or more holes formed therein so as to provide a constriction in the flow path.

3. An extrusion nozzle as claimed in claim 1, wherein downstream of the enlarged portion, said conduit comprises an outlet of a cross-sectional area that is smaller than that of the enlarged portion.

4. An extrusion nozzle as claimed in claim 1, wherein said inner conduit is generally circular or elliptical in cross-section, and each of the outer conduits is annular or ellipto-annular in cross section.

5. An extrusion apparatus comprising a stuffing horn and an extrusion nozzle as claimed in claim 1, wherein the stuffing horn comprises a plurality of nesting tubes that define an inner conduit and one or more outer conduits, and said stuffing horn can mate with the extrusion nozzles such that each stuffing horn conduit communicates with a respective nozzle conduit, wherein each tube is supported within its surrounding tube by a plurality of circumferentially spaced spacers.

6. An extrusion nozzle as claimed in claim 2, wherein downstream of the enlarged portion, said conduit comprises an outlet of a cross-sectional area that is smaller than that of the enlarged portion.

7. An extrusion nozzle as claimed in claim 2, wherein said inner conduit is generally circular or elliptical in cross-section, and each of the outer conduits is annular or ellipto-annular in cross section.

8. An extrusion nozzle as claimed in claim 3, wherein said inner conduit is generally circular or elliptical in cross-section, and each of the outer conduits is annular or ellipto-annular in cross section.

9. An extrusion apparatus comprising a stuffing horn and an extrusion nozzle as claimed in claim 2, wherein the stuffing horn comprises a plurality of nesting tubes that define an inner conduit and one or more outer conduits, and said stuffing horn can mate with the extrusion nozzles such that each stuffing horn conduit communicates with a respective nozzle conduit, wherein each tube is supported within its surrounding tube by a plurality of circumferentially spaced spacers.

10. An extrusion apparatus comprising a stuffing horn and an extrusion nozzle as claimed in claim 3, wherein the stuffing horn comprises a plurality of nesting tubes that define an inner conduit and one or more outer conduits, and said stuffing horn can mate with the extrusion nozzles such that each stuffing horn conduit communicates with a respective nozzle conduit, wherein each tube is supported within its surrounding tube by a plurality of circumferentially spaced spacers.

11. An extrusion apparatus comprising a stuffing horn and an extrusion nozzle as claimed in claim 4, wherein the stuffing horn comprises a plurality of nesting tubes that define an inner conduit and one or more outer conduits, and said stuffing horn can mate with the extrusion nozzles such that each stuffing horn conduit communicates with a respective nozzle conduit, wherein each tube is supported within its surrounding tube by a plurality of circumferentially spaced spacers.

12. A process for making a food product, which food product comprises a core of an extrudable food substrate, and one or more contiguous outer layers of the same or different extrudable food substrates disposed wholly or partly around the core, at least one of said outer layers comprising a fibrous meat or fat emulsion; said process comprising forming said core by extruding an extrudable food substrate through an inner extrusion conduit of an extrusion nozzle; and simultaneously forming the or each outer layer by co-extruding an extrudable food substrate through a respective outer extrusion conduit of said nozzle, which outer extrusion conduit is disposed wholly or partly around the inner conduit; wherein at least one outer extrusion conduit is adapted for extruding a fibrous fat or meat emulsion and defines a fluid flow path having a first narrow portion of relatively small cross-sectional area, followed by a second enlarged portion downstream of said narrow portion, which enlarged portion has a relatively large cross-sectional area, the arrangement being such that when said fibrous meat or fat emulsion passes successively through said narrow portion and said enlarged portion, fibres within the said fibrous meat or fat emulsion become disoriented, thereby increasing cohesiveness of the extruded emulsion.

13. A process as claimed in claim 12, wherein said narrow portion is defined by a wall across the flow path of said fibrous meat or fat emulsion, which wall defines one or more apertures formed therein so as to provide a constriction in the flow path.

14. A process as claimed in claim 12, wherein said conduit comprises an outlet downstream of the enlarged portion, which outlet has a cross-sectional area that is smaller than the cross-sectional area of said enlarged portion.

* * * * *

UNITED STATES PATENT AND TRADEMARK OFFICE
CERTIFICATE OF CORRECTION

PATENT NO. : 6,042,466

DATED : March 28, 2000

INVENTOR(S) : Matthews, et al.

It is certified that error appears in the above-identified patent and that said Letters Patent is hereby corrected as shown below:

Please change the title to read --EXTRUSION APPARATUS AND PROCESS--;

Please insert the following new Abstract:
--The invention provides an extrusion nozzle for forming a meat product comprising an extruded inner core of meat substrate and one or more co-extruded outer layers wholly or partly around the core, wherein at least one of the outer layers consists of a meat or fat emulsion; characterised in that the fibres within the meat or fat emulsion layer are distributed substantially uniformly within the emulsion layer and are disoriented, so as to improve the cohesiveness of that layer.--;

In column 1, after the Title, insert the following header --FIELD OF INVENTION--;

In column 1, after line 9, insert the following header --BACKGROUND OF INVENTION--;

In column 1, after line 62, insert the following header --BRIEF SUMMARY OF INVENTION--;

In column 3, before line 1, insert the following header --BRIEF DESCRIPTION OF DRAWINGS--

In column 3, after line 13, insert the following header --DETAILED DESCRIPTION OF INVENTION--;

UNITED STATES PATENT AND TRADEMARK OFFICE
CERTIFICATE OF CORRECTION

PATENT NO. : 6,042,466

DATED : March 28, 2000

INVENTOR(S) : Matthews, et al.

It is certified that error appears in the above-identified patent and that said Letters Patent is hereby corrected as shown below:

In column 3, line 36, change "(20)" to --(21)--;

In column 5, line 24, delete "of" (second occurrence); and

In column 5, line 42, change "mean" to --meat--.

Signed and Sealed this

Third Day of April, 2001

*Attest:*

NICHOLAS P. GODICI

*Attesting Officer*   *Acting Director of the United States Patent and Trademark Office*